United States Patent [19]

Vermeulen et al.

[11] Patent Number: 5,194,347
[45] Date of Patent: Mar. 16, 1993

[54] IMAGE-RECEIVING MATERIAL COMPRISING SUBBED POLYCARBONATE OR POLYPROPYLENE

[75] Inventors: Leon L. Vermeulen, Herenthout; Robert S. Pauwels, Brasschaat, both of Belgium

[73] Assignee: Agfa-Gevaert N.V., Mortsel, Belgium

[21] Appl. No.: 798,003

[22] Filed: Nov. 26, 1991

[30] Foreign Application Priority Data

Nov. 30, 1990 [EP] European Pat. Off. ......... 90203164.0

[51] Int. Cl.$^5$ ............................ G03C 5/54; G03C 1/80
[52] U.S. Cl. ..................................... 430/14; 430/227; 430/533; 430/534
[58] Field of Search ............... 430/227, 231, 232, 215, 430/533, 534, 536

[56] References Cited

U.S. PATENT DOCUMENTS

| 2,878,121 | 3/1959 | Gray | 430/231 |
|---|---|---|---|
| 3,397,987 | 8/1968 | Keberle et al. | 430/628 |
| 3,706,568 | 12/1972 | Haefner | 430/227 |
| 4,388,403 | 6/1983 | Helling et al. | 430/546 |
| 4,425,421 | 1/1984 | Rutges et al. | 430/231 |
| 4,429,032 | 1/1984 | Matthe et al. | 430/231 |
| 4,762,759 | 8/1988 | Vermeulen et al. | 430/231 |
| 4,902,593 | 2/1990 | Vermeulen et al. | 430/533 |
| 4,908,286 | 3/1990 | Veruloet | 430/232 |

Primary Examiner—Richard L. Schilling
Attorney, Agent, or Firm—William J. Daniel

[57] ABSTRACT

A sheet, ribbon or web material comprising a support made of a synthetic resin or a paper support coated with a layer of said resin, wherein a resin surface of said support is coated with a subbing layer and the subbing layer itself is coated with a hydrophilic colloid image-receiving layer containing development nuclei for silver image formation by DTR-processing, characterized in that the synthetic resin of said support is a polycarbonate or polypropylene resin, and said subbing layer contains in percent by weight on its total weight following ingredients: 1.3% to 80% of proteinaceous colloid, e.g. gelatin or caseine,
0% to 85% of colloidal silica,
1.0% to 70% of an ionogenic polyester-polyurethane applied from an aqueous dispersion wherein isocyanate groups still present in its structure have reacted with an ionomeric compound containing at least one active hydrogen atom and a carboxylate or sulphonate salt group, the number of said salt groups being sufficient to render said polyester-polyurethane dispersible in an aqueous medium, and 0% to 30% of a siloxane capable of forming a reaction product with said colloidal silica, the dry coverage of the image receiving layer being in the range of 0.2 g to 16 g per m$^2$.

12 Claims, No Drawings

IMAGE-RECEIVING MATERIAL COMPRISING SUBBED POLYCARBONATE OR POLYPROPYLENE

FIELD OF THE INVENTION

The present invention relates to hydrophobic resin support materials that contain a subbing layer improving the adherence of said support to a hydrophilic layer, and such materials for use in image recording.

BACKGROUND OF THE INVENTION

Resinous film base materials that are applied commonly in the manufacture of photographic silver halide emulsion materials or silver complex diffusion transfer reversal (DTR) image-receiving materials are inherently hydrophobic. The usual gelatino-silver halide emulsion layers and image-receiving layers containing development nuclei are highly hydrophilic.

A more recently developed diffusion transfer material is used in a dye diffusion transfer process wherein the dye diffusion transfer processing is controlled by the development of (an) image-wise exposed silver halide emulsion layer(s). Such dye diffusion transfer material contains a hydrophilic image-receiving layer for fixing the transferred dyes e.g. by mordanting.

A survey of dye diffusion transfer imaging processes and materials has been given by Christian C. Van de Sande in Angew. Chem.—Ed. Engl. 22 (1983) No. 3, 191-209 and in Research Disclosure November 1976 item 15162.

It is difficult to secure adequate anchorage between the hydrophobic film base and a hydrophilic colloid layer, especially because the anchorage must remain firm throughout all the liquid processing steps the material is subjected to.

Polyester material, e.g. polyethylene terephthalate, has found commercial application as a film base for photographic materials and many techniques for improving the adherence of hydrophilic colloid layers thereto have been proposed. Polyester film material is rather expensive and where the use of cheaper hydrophobic film materials without loss of particularly desired qualities is possible, or other properties, e.g. heat-sealing at moderate temperature, are required, polyester material is replaced as a film support. A substitute for polyester material is polyvinyl chloride but may pose ecological problems on incineration.

Polyvinyl chloride supports have been used in the production of DTR-image receiving materials as described e.g. in published EP-A 0065329 and corresponding U.S. Pat. No. 4,429,032 and in published EP-A 0276506 and corresponding U.S. Pat. No. 4,908,286.

Chlorine-free ecologically acceptable film forming polymers wherefrom transparent mechanically very strong film base materials can be made are polycarbonates and polypropylene (ref. e.g. Hermann Römpp—Chemie Lexikon—Franckh'sche Verlagshandlung Stuttgart—6. Auflage, (1966), p. 5034 and 5062-5063).

SUMMARY OF THE INVENTION

It is an object of the present invention to provide a subbed polycarbonate or polypropylene support wherein the subbing layer ensures in dry as well as in wet state a particularly good adherence to said supports of a hydrophilic colloid image-receiving layer containing development nuclei for DTR-processing.

It is a further object of the present invention to provide a laminated article containing a said image receiving layer after producing an image therein and said article serves as tamperproof identification document.

Other objects and advantages of the present invention will appear from the further description.

The present invention relates to a sheet, ribbon or web material comprising a support made of a synthetic resin or a paper support coated with a layer of said resin, wherein a resin surface of said support is coated with a subbing layer and the subbing layer itself is coated with a hydrophilic colloid image-receiving layer containing development nuclei for silver image formation by DTR-processing, characterized in that the synthetic resin of said support is a polycarbonate or polypropylene resin, and said subbing layer contains in percent by weight on its total weight following ingredients:

1.3% to 80% of proteinaceous colloid, e.g. gelatin or caseine,

0% to 85% of colloidal silica, 1.0% to 70% of an ionogenic polyester-polyurethane applied from an aqueous dispersion wherein isocyanate groups still present in its structure have reacted with an ionomeric compound containing at least one active hydrogen atom and a carboxylate or sulphonate salt group, the number of said salt groups being sufficient to render said polyester-polyurethane dispersible in an aqueous medium, and 0% to 30% of a siloxane capable of forming a reaction product with said colloidal silica, the dry coverage of the image receiving layer being in the range of 0.2 g to 16 g per m².

In DTR-processing the development nuclei are capable of operating as a catalyst in the reduction of diffusion-transferred silver complex compounds. When incorporating the development nuclei in the subbing layer itself no silver image of practical useful optical density can be obtained, such certainly not when the subbing layer containing the development nuclei is applied onto a transparent support and the silver image has to be inspected in transmission.

DETAILED DESCRIPTION OF THE INVENTION

Polycarbonate resins suited for use according to the present invention can be prepared by methods described by D. Freitag, U. Grigo, P. R. Müller and W. Nouvertne in the Encyclopedia of Polymer Science and Engineering, 2nd ed., Vol. II, pages 648-718, (1988) published by Wiley and Sons Inc.

Preferred for use according to the present invention are aromatic polycarbonates examples of which have repeating units within the scope of the following general formula:

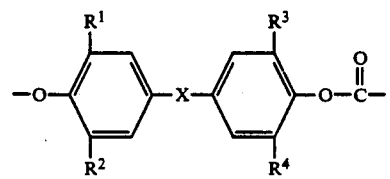

wherein: X represents S, SO₂,

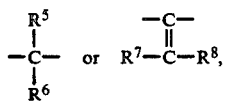

each of $R^1$, $R^2$, $R^3$, $R^4$, $R^7$ and $R^8$ (same or different) represents hydrogen, an alkyl group or an aryl group, and each of $R^5$ and $R^6$ (same or different) represents hydrogen, an alkyl group, an aryl group or together represent the necessary atoms to close a cycloaliphatic ring, e.g. cyclohexane ring.

Aromatic polycarbonates having a weight-averaged molecular weight in the range of 10,000 to 500,000 are preferred. Suitable polycarbonates having such a high molecular weight are sold under the registered trade mark MAKROLON of Bayer AG, W-Germany.

The preparation of polypropylene proceeds by addition reaction of propylene preferably in the presence of catalysts known to those skilled in the art for producing the isotactic version [ref. e.g. Encyclopedia of Polymer Science and Engineering, Volume 13, (1988) under the heading "propylene polymers"].

The resin support for use according to the present invention may contain pigments or dyes as colouring matter e.g. in an amount up to 5% by weight. An opaque white appearance may be obtained by incorporation, e.g. by co-extrusion, of white pigments, e.g. titanium dioxide particles.

The preparation of anionic polyester-polyurethanes suited for use according to the present invention is described in U.S. Pat. No. 3,397,989 U.S. Pat. No. 4,388,403 and DE-A 3 630 045, wherein specific examples of polyester-polyurethane compounds containing carboxylate and/or sulphonate groups are mentioned.

According to U.S. Pat. No. 3,397,989 anionic polyurethanes are used as plasticizing agents for gelatin and according to U.S. Pat. No. 4,388,403 said polyurethanes are used for the preparation of aqueous dispersions of "loaded" hydrophobic substances.

The subbing layer composition for use according to the present invention is applied from an aqueous dispersion of said polyester-polyurethane which for good dispersion properties contains a quantity of anionic carboxylate and/or sulphonate salt groups sufficient to make the polyester-polyurethane dispersable in aqueous medium optionally in the presence of a water-miscible or poorly watermiscible solvent.

Said solvent may improve the adherence of the subbing layer to the polycarbonate or polypropylene support by superficially attacking (etching) the latter. Suitable solvents for that purpose are: diacetone alcohol, tetrahydrofuran and ethyl acetate.

Preferably the sulfonate and/or carboxylate groups total about 0.5 to about 15% by weight with respect to the polyester-polyurethane.

The polyester-polyurethane is preferably a polyurethane of an essentially linear polyester compound that has two terminal hydroxyl groups, the polyester having preferably a molecular weight of about 300 to about 20,000.

Preferred anionic polyester-polyurethanes for use according to the present invention in combination with gelatin and/or caseine contain linear polyester structural parts corresponding with a polyester of a dicarboxylic acid containing up to 6 carbon atoms and a polyhydric aliphatic alcohol containing up to 6 carbon atoms.

An anionic polyester-polyurethane dispersion that is particularly useful for preparing a coating composition for forming an adhering waterpermeable layer on a polycarbonate or polypropylene resin support is called hereinafter composition A which contains in percentage by weight with respect to the total dispersion composition the reaction product of:

(1) the polyester of adipic acid and hexanediol with average molecular weight 840, (23%), (2) 4,4'-diisocyanato-dicyclohexylmethane (14%), (3) dimethylolpropionic acid (2%), (4) trimethylamine (1.5%), said reaction product being dispersed in water containing 7.5% by weight of N-methylpyrrolidinone, the balance being water.

Another polyester-polyurethane dispersion particularly suited for use according to the present invention is prepared according to Example 1 of (German Auslegeschrift) DE-A 3 630 045.

For the formation of the subbing layer used according to the present invention invention the amount of proteinaceous colloid, e.g. gelatin or caseine, may vary within wide limits with respect to the anionic polyester-polyurethane, such in view of the desired degree of waterpermeability and/or hardening possibilities of the coated layer.

Colloidal silica suited for use according to the present invention is preferably hydrated silica used as a dispersion having a pH in the range of 8 to 9. The colloidal silica particles used in the present invention have preferably an average grain diameter between 10 and 100 nm. Such silica particles are available in aqueous colloidal dispersions marketed under the commercial names "LUDOX" (trade name of E. I. du Pont de Nemours. Wilmington, Del. U.S.A., and "SYTON" (trade name of Monsanto Chemical Corporation, Boston, Mass. USA and "KIESELSOL" (trade name of Farbenfabriken Bayer AG, Leverkusen, West-Germany). SYTON X-30 is a trade name of Monsanto Chemical Company, St. Louis, Mo., U.S.A. for a 30% by weight aqueous dispersion of silica particles having an average size of 25 nm) and KIESELSOL 300-F (trade name of Farbenfabriken Bayer AG, Leverkusen, West-Germany) comprising a colloidal silica having an average particle size of 7-8 nm.

Representatives of siloxane compounds for use according to the present invention are within the scope of the following general formula:

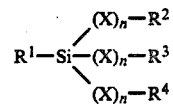

wherein:

$R^1$ represents a chemical group capable of a polymerization reaction or reactive with respect to amino and-/or hydroxyl groups present in proteinaceous material such as gelatin and caseine, more particularly is a group containing reactive halogen such as a reactive chlorine atom, an epoxy group or an alpha-beta-ethylenically unsaturated group, representatives of such groups being e.g. the following:

-continued

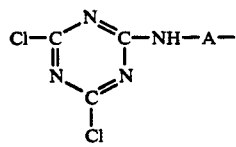

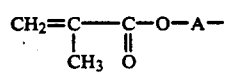

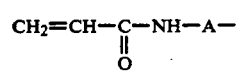

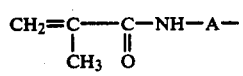

wherein A represents an alkylene group preferably a C$_1$-C$_4$ alkylene group, and

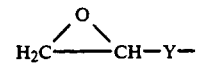

wherein Y is a bivalent hydrocarbon chain including such chain interrupted by oxygen, e.g. is a —CH$_2$—O(CH$_2$)$_3$— group, or a bivalent hydrocarbon group that is linked at the side of the silicon atom to oxygen, e.g. is a —CH$_2$—O— group, X represents oxygen, each of R$^2$, R$^3$ and R$^4$ (same or different) represents a hydrocarbon group including a substituted hydrocarbon group e.g. methyl and ethyl, and n is 1.

Siloxane compounds according to the above general formula are described in U.S. Pat. No. 3,661,584 and GB-P 1,286,467 as compounds improving the adherence of proteinaceous colloid compositions to glass.

Examples of particularly useful siloxane compounds are listed in the following table 1.

TABLE 1

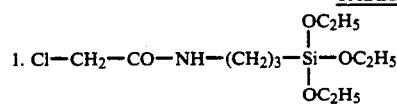

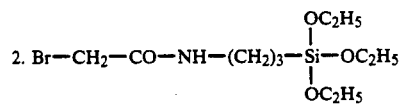

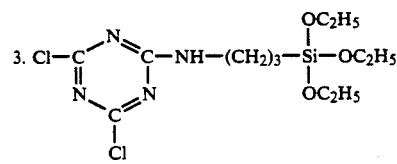

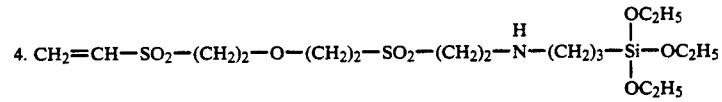

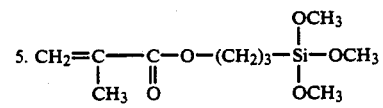

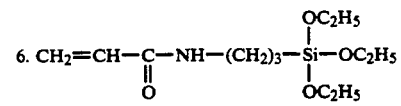

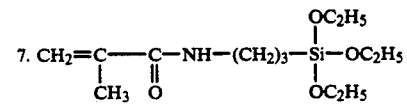

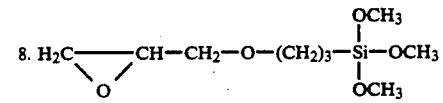

The reaction of the siloxane group with the colloidal silica proceeds vary rapidly in aqueous medium through a hydrolysis and dehydration reaction, which actually is a condensation reaction with hydrated silica, i.e. Si-(OH)$_4$. The R$^1$ group in the siloxane compound is at room temperature (20°) preferably not strongly reactive with respect to gelatin so that the coating solution does not obtain a prohibitively high viscosity in the coating stage. Full hardening by crosslinking is preferably carried out at elevated temperature after the image formation, e.g. by heating during a heat-sealing lamination step.

By the siloxane group a macrosiloxane is formed with the colloidal hydrated silica according to the following reaction scheme:

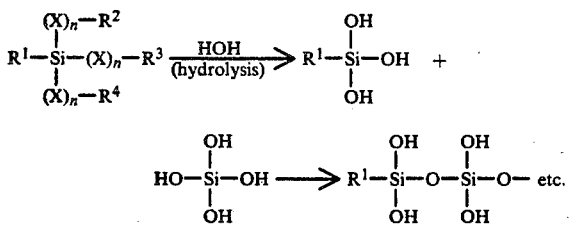

To reduce repellence on coating and improving coating speed the polycarbonate or polypropylene support which may be a polypropylene coated paper support is pre-treated with a corona discharge by passing the support, e.g. in sheet or belt form, between a grounded conductive roller and corona wires whereto an alternating current (AC) voltage is applied with sufficiently high potential to cause ionization of the air. Preferably the applied peak voltage is in the range of 10 to 20 kV. An AC corona unit is preferred because it does not need the use of a costly rectifier unit and the voltage level can be easily adapted with a transformer. In corona-discharge treatment with an an AC corona unit a frequency range from 10 to 100 kHz is particularly useful. The corona treatment can be carried out with material in the form of a belt or band at a speed of 10 to 30 m per min while operating the corona unit with a current in the range of 0.4 to 0.6 A over a belt or band width of 25 cm.

The corona-discharge treatment makes it possible to dispense with a solvent treatment for attacking and roughening the surface of the resin support and is less expensive and more refined in its application.

An image-receiving material composed according to the present invention containing a hydrophobic resin support yields rapidly a touch dry print by DTR-image formation.

The development nuclei used in the image-receiving layer prepared according to the present invention are of the kind generally known in the art, e.g. are those described in the already mentioned book of Andre Rott and Edith Weyde, pages 54-56. Particularly suited are colloidal silver and colloidal metal sulphides, e.g. of silver and nickel and mixed sulphides thereof. The image-receiving material may include in the image-receiving layer any other additive known for use in such materials, e.g. toning agents, a certain amount of silver halide solvent, one or more developing agents, opacifying agents, e.g. pigments, and optical brightening agents.

The image-receiving layer can form part of a separate image-receiving material or form an integral combination with the light-sensitive layer(s) of the photographic material.

When after processing of such integral photographic material the image-receiving layer remains associated with the silver halide emulsion layer(s) on a common support, an alkali-permeable light-shielding layer, e.g. containing white pigment particles, is applied preferably between the image-receiving layer and the silver halide emulsion layer(s) to mask the negative image with respect to the positive image as described e.g. in the already mentioned book of Andre Rott and Edith Weyde, page 141.

According to a particular embodiment in an image-receiving material of the present invention the polycarbonate or polypropylene support is provided with an adhesive coating at the side opposite to the DTR-image-receiving layer. The adhesive coating, which may be of the pressure-adhesive type, may be protected by a strippable temporary support, e.g. a strippable temporary support on the basis of siliconized glassine paper as described in Research Disclosure, March 1977, item 15513. Said image-receiving material being an adhesive-backed sheet material is suited e.g. for use in paste-ups, e.g. as decalcomania, in lay-outs and for text and drawing corrections. Further are mentioned its use in the production of masks that are obtained by cutting the imaged material following the image contours. The obtained adhesive masks can be used in silk screen printing and airbrush creations wherein the masks shield a base in a desired way for coverage with an ink applied by spraying.

The present DTR-image-receiving material is particularly suited for application in the production of laminar articles comprising a photograph. Thus, it is applied advantageously in the manufacture of a laminar article serving as identification document, also called I.D. card, that contains a black-and-white photograph produced by the silver complex DTR-process and by lamination is sandwiched between a clear protective resin cover sheet and the polycarbonate or polypropylene support or a polypropylene coated paper support.

In view of the widespread use of I.D. cards as security document, e.g. to establish a person's authorization to conduct certain activities (e.g. driver's licence) or to have access to certain areas or to engage in particular commercial actions, it is important that forgery of the I.D. card by alteration of certain of its data and/or photograph is made impossible.

In the production of a laminar article the above defined image-receiving layer containing an image produced by DTR-processing is preferably laminated to a transparent hydrophobic resin cover sheet by a technique known as heat-sealing. The hydrophobic resin cover sheet is preferably a resin sheet coated with or consisting of a resin having a lower melting temperature (Tm) than the resin present in the support sheet. According to a preferred embodiment the cover sheet is a polyethylene terephthalate resin sheet coated with a resinous melt-adhesive layer, e.g. a polyalkylene layer, preferably polyethylene layer, having a melting temperature at least 30° C. lower than the melting temperature of the resin of the support sheet of the laminar article. In this connection Tm values of polyethylene, polypropylene, and polyethylene terephthalate are mentioned which are respectively 137° C., 176° C. and 260° C. [see Plastics by Dr. A. E. Schouten/Dr. ir. A. K. van der Vegt—Utrecht Prisma-Compendia Het Spectrum. (1966), p. 150].

The lamination of the present image receiving material with a covering hydrophobic resin film sheet material proceeds preferably by heat-sealing between flat steel plates under a pressure of, e.g., 10 to 15 kg/cm2 at a temperature in the range of 120° to 150° C., e.g. at 135° C., or by using other apparatus, e.g. roller-laminator available on the market for heat-sealing lamination purposes.

According to an embodiment the image-receiving layer is coated onto an opaque polycarbonate or polypropylene support having a thickness of only 0.150 to 0.75 mm. A sheet of that thickness can still be manipulated easily in a mechanical printing process, e.g. offset or intaglio printing, and before or after being coated with the image-receiving layer can receive, additional security marks in the form of e.g. a watermark, finger prints, printed patterns known from bank notes, coded information, e.g. binary code information, signature or other printed personal data that may be applied with fluorescent pigments and/or visibly legible or ultraviolet-legible printing inks as described e.g. in GB-P 1,518,946 and U.S. Pat. No. 4,105,333.

Other possibilities to increase security against counterfeiting are the inclusion in the laminate of infrared-absorbing markings, magnetic dots or strips and electronic microcircuits hidden from visibility, and holograms as described, e.g., in DE-OS 2 639 952, GB-P 1,502,460 and 1,572,442 and U.S. Pat. No. 3,668,795. The holographic patterns may be obtained in silver halide emulsion layers, normally Lippmann emulsions, especially designed for that purpose and can either or not be combined with a photograph.

According to an embodiment the silver halide emulsion layer for producing the hologram is applied to one side of the transparent cover sheet used in the manufacture of a laminate according to the present invention and laminated together with the image receiving layer either or not separated therefrom by a transparent resin intersheet made of polyethylene or a resin sheet such as a polyvinyl chloride sheet coated with polyethylene.

The support may be provided with an embossed structure.

According to a preferred embodiment the image receiving material according to the present invention, after forming therein a silver image by silver complex diffusion transfer processing, is treated with a compound serving as hardening agent for its proteinaceous material.

Any hardening agent known to those skilled in the art for hardening gelatin and/or caseine can be used.

Very efficient hardening is obtained with poly-epoxy compounds, particularly a tri-epoxy compound described in DE-OS 2 935 354, especially triglycidyl-triazolidin-3,5-dione.

Other particularly suitable hardening agents are N-methylol compounds, e.g. the N-methylol based hardening agents described in published Japanese patent application (Kokai) 60 170.841, and resins such as melamine-formaldehyde resins still containing such groups.

The hardening agents are applied preferably from an aqueous composition serving as rinsing liquid after effecting silver complex diffusion transfer processing.

The following examples illustrate the present invention without, however, limiting it thereto.

All parts, ratios and percentages are by weight unless otherwise stated.

EXAMPLE 1

An opaque isotactic polypropylene or bisphenol A polycarbonate support having a thickness of 200 μm was treated with an electrical discharge produced by a corona-discharge apparatus operated under the following conditions:
  film-travelling speed: 20 m/min.
  electrode spacing to film surface: 2 mm.
  corona current: 0.55 A.
  AC-voltage difference (peak value): 10 kV.
  frequency: 30 kHz.

The corona-treated surface was coated with the following composition to form a subbing layer for a hydrophilic colloid image-receiving layer containing development nuclei for DTR-processing:

| | |
|---|---|
| water | 500 ml |
| 30% aqueous dispersion of colloidal silica (average particle size 0.025 μm, pH: 8) | 200 ml |
| gelatin | 12.2 g |
| 40% aqueous dispersion of composition A | 50 ml |
| water including the necessary spreading agent up to | 932 ml |

Said composition was applied at a wet coverage of 35 $m^2/l$ and dried.

EXAMPLE 2

Example 1 was repeated with the difference, however, that the following coating composition was applied:

| | |
|---|---|
| water | 500 ml |
| gelatin | 20 g |
| 42.9% aqueous dispersion of polyester-polyurethane prepared according Example 1 of DE-A 3 630 045 | 250 ml |
| 5% solution in methanol of siloxane compound No. 8 of Table 1 | 50 ml |
| water including the necessary spreading agent up to | 1857 ml |

Said composition was applied at a wet coverage of 27 $m^2/l$ and dried.

EXAMPLE 3

Example 1 was repeated with the difference, however, that the following coating composition was applied:

| | |
|---|---|
| water | 500 ml |
| gelatin | 20 g |
| 42.9% aqueous dispersion of polyester-polyurethane prepared according Example 1 of DE-A 3 630 045 | 250 ml |
| 5% solution in methanol of siloxane compound No. 8 of Table 1 | 10 ml |
| 40% aqueous dispersion of composition A | 100 ml |
| water including the necessary spreading agent up to | 1857 ml |

Said composition was applied at a wet coverage of 27 $m^2/l$ and dried.

EXAMPLE 4

Example 1 was repeated with the difference, however, that the following coating composition was applied:

| | |
|---|---|
| water | 500 ml |
| gelatin | 20 g |
| 5% solution in ethanol of siloxane compound No. 8 of Table 1 | 50 ml |
| 40% aqueous dispersion of composition A | 250 ml |
| diacetone alcohol | 20 ml |
| water including the necessary spreading agent up to | 1857 ml |

Said composition was applied at a wet coverage of 27 $m^2/l$ and dried.

EXAMPLE 5

An opaque isotactic polypropylene or bisphenol A polycarbonate support having a thickness of 200 pm was treated with an electrical discharge produced by a corona-discharge apparatus operated under the following conditions:

film-travelling speed: 20 m/min,
electrode spacing to film surface: 2 mm,
corona current: 0.55 A,
AC-voltage difference (peak value): 10 kV,
frequency: 30 kHz.

The corona-treated surface was coated with an aqueous coating liquid having the following composition for forming a subbing layer:

| | |
|---|---|
| water | 500 ml |
| 30% aqueous dispersion of colloidal silica (average particle size 0.025 μm, pH: 8) | 200 ml |
| gelatin | 12.2 g |
| 40% aqueous dispersion of composition A | 50 ml |
| 5% aqueous TERGITOL 4 (trade name) wetting agent solution | 2 ml |
| water including the necessary spreading agent up to | 932 ml |

Said composition was applied at a gelatin coverage of 0.38 g/m² and dried.

Onto the dried subbing layer a DTR-image receiving layer was applied from the following aqueous coating liquid:

| | |
|---|---|
| water | 257 ml |
| 10.73 × 10⁻³ mol per kg dispersion of colloidal silver-nickel sulphide development nuclei in 5.6% aqueous gelatin solution | 8.7 g |
| gelatin | 25.5 g |
| 5% aqueous TERGITOL 4 (trade name) wetting agent solution | 2 ml |

Said composition was applied at a gelatin coverage of 1.22 g/m² and dried.

Onto the dried DTR-image receiving layer the following aqueous coating liquid was applied to form a protective topcoat:

| | |
|---|---|
| water | 500 ml |
| gelatin | 12.2 g |
| 10% aqueous formaldehyde solution | 4.9 ml |
| 5% aqueous solution of TERGITOL 4 (trade name) | 10 ml |
| 12.5% aqueous solution of oleylmethyltauride | 10 ml |
| 5% aqueous solution of ammoniumperfluorocaprylate | 2 ml |

Said composition was applied at a gelatin coverage of 0.55 g/m2 and dried.

TERGITOL 4 is a trade name of Union Carbide & Carbon, New York, N.Y., USA for a wetting agent having the following structure:

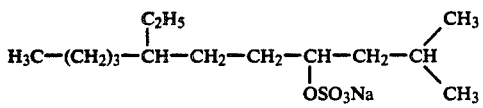

Oleylmethyltauride and ammoniumperfluorocaprylate are commercially available wetting agents.

By the common silver complex DTR-process a black-and-white silver image serving for identification purposes was produced in the thus prepared image-receiving material.

The adherence in wet as well as in dry state of the image-receiving layer to its above subbed support proved to be very good.

Before being used to form an identification Card laminate the imagereceiving material was printed with selected patterns of nacreous pigments and ultra-violet light absorbing fluorescent ink.

Onto the thus treated image-receiving layer a polyethylene terephthalate sheet of 50 pm being pre-coated at one side with a polyethylene sheet of 30 pm was laid and laminated with the polyethylene in contact with the topcoat of the image-receiving layer. Flat steel plates were used for pressing together the superposed materials under a pressure of 10 kg/cm² at a temperature of 135° C.

The image present in the thus laminated image-receiving material was protected against forgery by the very good adherence of the different layer elements.

We claim:

1. A sheet, ribbon or web material comprising a support made of a synthetic resin or a paper support coated with a layer of said resin, wherein a resin surface of said support is coated with a subbing layer and the subbing layer itself is coated with a hydrophilic colloid image-receiving layer containing development nuclei for silver image formation by DTR-processing, characterized in that the synthetic resin of said support is a polycarbonate or polypropylene resin, and said subbing layer contains in percent by weight on its total weight following ingredients: 1.3% to 80% of proteinaceous colloid,
   0% to 85% of colloidal silica,
   10% to 70% of an ionogenic polyester-polyurethane applied from an aqueous dispersion wherein isocyanate groups still present in its structure have reacted with an ionomeric compound containing at least one active hydrogen atom and a carboxylate or sulphonate salt group, the number of said salt groups being sufficient to render said polyester-polyurethane dispersible in an aqueous medium, and 0% to 30% of a siloxane capable of forming a reaction product with said colloidal silica, the dry coverage of the image receiving layer being in the range of 0.2 g to 16 g per m².

2. Sheet, ribbon or web material according to claim 1, wherein the polycarbonate is an aromatic polycarbonate.

3. Sheet, ribbon or web material according to claim 1, wherein the polypropylene is isotactic polypropylene.

4. Sheet, ribbon or web material according to claim 1, wherein said proteinaceous colloid is gelatin or caseine.

5. Sheet, ribbon or web material according to claim 1, wherein the subbing layer is applied from an aqueous dispersion of said polyester-polyurethane containing a quantity of anionic carboxylate and/or sulphonate salt groups sufficient to make the polyester-polyurethane dispersable in aqueous medium.

6. Sheet, ribbon or web material according to claim 5, wherein said aqueous medium contains a water-miscible or poorly watermiscible solvent capable of superficially attacking (etching) the polycarbonate or polypropylene.

7. Sheet, ribbon or web material according to claim 1, wherein said polyester-polyurethane is a polyurethane of an essentially linear polyester compound that has two terminal hydroxyl groups, the polyester having preferably a molecular weight of about 300 to about 20,000.

8. Sheet, ribbon or web material according to claim 1, wherein said anionic polyester-polyurethane contains linear polyester structural parts corresponding with a polyester of a dicarboxylic acid containing up to 6 carbon atoms and a polyhydric aliphatic alcohol containing up to 6 carbon atoms.

9. Sheet, ribbon or web material according to claim 1, wherein said colloidal silica has an average grain diameter between 10 and 100 nm.

10. Sheet, ribbon or web material according to claim 1, wherein said siloxane is within the scope of the following general formula:

$$R^1-Si\begin{matrix}(X)_n-R^2\\(X)_n-R^3\\(X)_n-R^4\end{matrix}$$

wherein:
$R^1$ represents one of the following groups:

$$Cl-CH_2-CO-NH-A-$$

$$Br-CH_2-CO-NH-A-$$

$$Cl-\underset{\underset{\underset{Cl}{|}}{C}}{\overset{N}{\underset{N}{C}}}\overset{N}{C}-NH-A-$$

$$CH_2=CH-SO_2-CH_2-O-CH_2-SO_2-CH_2-NH-A-$$

-continued $$CH_2=\underset{CH_3}{\overset{|}{C}}-\underset{O}{\overset{\|}{C}}-O-A-$$

$$CH_2=CH-\underset{O}{\overset{\|}{C}}-NH-A-$$

$$CH_2=\underset{CH_3}{\overset{|}{C}}-\underset{O}{\overset{\|}{C}}-NH-A-$$

wherein A represents a $C_1$-$C_4$ alkylene group, or wherein $R^1$ represents the group $$H_2C\overset{O}{\underset{}{\diagup\diagdown}}CH-Y-$$

wherein Y is a bivalent hydrocarbon chain including such chain interrupted by oxygen, or a bivalent hydrocarbon group that is linked at the side of the silicon atom to oxygen, X represents oxygen, each of $R^2$, $R^3$ and $R^4$ (same or different) represents a hydrocarbon group including a substituted hydrocarbon group, and n is 1.

11. Sheet material according to claim 1, wherein said image receiving material contains a black-and-white photograph and is present in a laminar article containing said image-receiving layer sandwiched between a clear protective resin cover sheet and said support.

12. Sheet material according to claim 11, wherein said cover sheet is a polyethylene terephthalate sheet coated with a polyethylene layer.

* * * * *